United States Patent
Kakinuma et al.

(10) Patent No.: US 10,490,827 B2
(45) Date of Patent: Nov. 26, 2019

(54) ALLOY ELECTRODE CATALYST AND FUEL CELL USING THE SAME

(71) Applicant: UNIVERSITY OF YAMANASHI, Yamanashi (JP)

(72) Inventors: Katsuyoshi Kakinuma, Yamanashi (JP); Makoto Uchida, Yamanashi (JP); Akihiro Iiyama, Yamanashi (JP)

(73) Assignee: UNIVERSITY OF YAMANASHI, Yamanashi (JP)

( * ) Notice: Subject to any disclaimer, the term of this patent is extended or adjusted under 35 U.S.C. 154(b) by 333 days.

(21) Appl. No.: 15/444,517

(22) Filed: Feb. 28, 2017

(65) Prior Publication Data

US 2017/0250409 A1 Aug. 31, 2017

(30) Foreign Application Priority Data

Feb. 29, 2016 (JP) ................. 2016-038455

(51) Int. Cl.
- H01M 4/92 (2006.01)
- C22C 5/04 (2006.01)
- H01M 8/1018 (2016.01)

(52) U.S. Cl.
CPC ............. *H01M 4/921* (2013.01); *C22C 5/04* (2013.01); *H01M 4/925* (2013.01); *H01M 2008/1095* (2013.01); *H01M 2250/20* (2013.01)

(58) Field of Classification Search
CPC ..... H01M 2008/1095; H01M 2250/20; H01M 4/921; H01M 4/925; C22C 5/04; Y02T 90/32

See application file for complete search history.

(56) References Cited

U.S. PATENT DOCUMENTS

| | | | |
|---|---|---|---|
| 2003/0054227 A1 | 3/2003 | Hiroshima et al. | |
| 2010/0233574 A1 | 9/2010 | Masao et al. | |
| 2012/0295184 A1 | 11/2012 | Watanabe et al. | |
| 2016/0087285 A1* | 3/2016 | Watanabe | B22F 9/26 429/523 |

FOREIGN PATENT DOCUMENTS

| | | | |
|---|---|---|---|
| JP | 2003-092114 A | 3/2003 | |
| JP | 2004-363056 A | 12/2004 | |

(Continued)

OTHER PUBLICATIONS

Y. Senoo, K. Taniguchi, K. Kakinuma, M. Uchida, H. Uchida, S. Deki, M. Watanabe. Cathodic performance and high potential durability of Ta-SnO2-δ-supported Pt catalysts for PEFC cathodes, Electrochemistry Communications 51 (2015) 37-40.*

(Continued)

*Primary Examiner* — Carlos Barcena
(74) *Attorney, Agent, or Firm* — Maier & Maier, PLLC

(57) ABSTRACT

To spread the use of catalysts for fuel cells, there is a demand to develop a catalyst that uses less Pt and has a high power generation efficiency. An electrode catalyst includes a support particle containing a metal oxide and a precious-metal alloy supported on the support particle. The support particle includes multiple branches, a hole between the branches, and a pore. The pore is surrounded by the branches and the hole. The precious-metal alloy includes a precious metal element and at least one or more transition elements.

9 Claims, 16 Drawing Sheets

(56) References Cited

FOREIGN PATENT DOCUMENTS

| | | | |
|---|---|---|---|
| JP | 2005-174835 | A | 6/2005 |
| JP | 2006-026586 | A | 2/2006 |
| JP | 2008-155111 | A | 7/2008 |
| JP | 5322110 | B2 | 10/2013 |
| JP | 5515019 | B2 | 6/2014 |

OTHER PUBLICATIONS

A. Stassi, I. Gatto, V. Baglio, E. Passalacqua, A. S. Aricò. Oxide-supported PtCo alloy catalyst for intermediate temperature polymer electrolyte fuel cells, Applied Catalysis B: Environmental 142-143 (2013) 15-24.*

Takeoh Okanishi, Toshiaki Matsui, Tatsuya Takeguchi, Ryuji Kikuchi, Koichi Eguchi, Applied Catalysis A, 298, 2006, 181-187; 7 pgs.

Naoto Kamiuchi, Tomohiro Mitsui, Nobutada Yamaguchi, Hiroki Muroyama, Toshiaki Matsui, Ryuji Kikuchi, Koichi Eguchi, Catalysis Today, vol. 157, Issues 1-4, Nov. 17, 2010, pp. 415-419; 5 pgs.

\* cited by examiner

FIG.5

| x | 20 | 25 | 33.33 | 0 |
|---|---|---|---|---|
| TEM IMAGE | | | | |
| PARTICLE DIAMETER DISTRIBUTION | | | | |
| PARTICLE DIAMETER $d_{TEM}$ / nm | 2.7 ± 0.9 | 2.8 ± 0.9 | 3.1 ± 0.8 | 2.7 ± 0.7 |

ALLOY ELECTRODE CATALYST AND FUEL CELL USING THE SAME

TECHNICAL FIELD

The present invention relates to an alloy electrode catalyst and a fuel cell using the same. In particular, the invention relates to an electrode catalyst for fuel cells that is stable and highly active at high potential and a polymer electrolyte fuel cell using the same.

BACKGROUND ART

A polymer electrolyte fuel cell (PEFC) includes a catalyst layer serving as an anode (a fuel electrode) on one side of a polymer electrolyte membrane, a catalyst layer serving as a cathode (an air electrode) on the other side thereof, and gas diffusion layers bonded to the outsides of the catalyst layers. Each catalyst layer is formed of a supported catalyst where catalyst particles containing a precious metal are highly dispersed and supported on nano-level support particles.

By supplying hydrogen serving as a fuel to the anode and oxygen or air to the cathode, power is generated in accordance with Reaction Formulas (1), (2) below.

Reaction at anode: $2H_2 \rightarrow 4H^+ + 4e$ (1)

Reaction at cathode: $O_2 + 4H^+ + 4e^- \rightarrow 2H_2O$ (2)

Technologies relating a catalyst for fuel cells that generate power by causing the above reactions have been disclosed in, for example, Japanese Unexamined Patent Application Publication Nos. 2006-026586, 2004-363056, 2003-092114, 2005-174835, and 2008-155111, Japanese Patent Nos. 5322110 and 5515019, Takeoh Okanishi, Toshiaki Matsui, Tatsuya Takeguchi, Ryuji Kikuchi, Koichi Eguchi, *Applied Catalysis A*, 298, 2006, pp. 181-187, and Naoto Kamiuchi, Tomohiro Mitsui, Nobutada Yamaguchi, Hiroki Muroyama, Toshiaki Matsui, Ryuji Kikuchi, Koichi Eguchi, *Catalysis Today*, volume 157, issues 1-4, Nov. 17, 2010, pp. 415-419. Japanese Patent No. 5515019 proposes the use of a chain-structured oxide and/or nitride support as a support for Pt and Pt-alloy catalysts. Japanese Patent No. 5515019 states that a chain-structured Pt and Pt-alloy catalyst supporting oxide and/or nitride support has improved durability at high potential and allows for the expression of catalytic activity equivalent to that of a Pt-supported carbon catalyst.

SUMMARY OF INVENTION

During a start/stop operation, the potential of the cathode of a polymer electrolyte fuel cell reaches 0.9 V or more. At this time, a support formed of a carbon material used in the cathode significantly degrades due to oxidation reaction represented by Reaction Formula (3) below, resulting in significant reductions in the performance of a catalyst on the support and the fuel cell.

$C + 2H_2O \rightarrow CO_2 + 4H^+ + 4e^-$ (E0=0.207 V vs SHE) (3)

For this reason, there is a demand for a support that is chemically stable at a high potential of 0.9 V or more and has both high conductivity and a high specific surface area.

To solve the above corrosion-related problem, Japanese Unexamined Patent Application Publication Nos. 2006-026586, 2004-363056, 2003-092114, 2005-174835, and 2008-155111 propose catalysts that are each prepared by making a chemically stable oxide and nitrogen finer to increase the specific surface area and then supporting platinum and/or alloy compound thereof on the resulting oxide and nitride. However, the conductivity of these catalysts is insufficient. For such catalysts to exhibit catalyst performance, carbon (carbon black, graphitized carbon, etc.) needs to be added thereto.

Typical materials other than carbon materials used as supports include oxides, nitrides, and carbides that are chemically stable and conductive. However, even if such materials are made finer, it is not possible to highly disperse and support a required amount of Pt thereon. Accordingly, it is not possible to develop a practical catalyst that prevents corrosion and has high catalytic activity. Further, the widespread use of catalysts for fuel cells requires the development of a catalyst that uses less Pt and has high power generation efficiency.

An electrode catalyst of the present invention includes a carrier particle containing a metal oxide and a precious-metal alloy supported on the carrier particle. The carrier particle includes multiple branches, a hole between the branches, and a pore. The pore is surrounded by the branches and the hole. The precious-metal alloy includes a precious metal element and at least one or more transition elements.

According to the present invention, it is possible to activate the electrode reaction in the catalyst layer and to improve the power generation performance of the fuel cell, as well as to reduce the usage of Pt. Thus, the use of the alloy electrode catalyst of the present invention allows for the production of a polymer electrolyte fuel cell that is low-cost, has excellent durability and catalytic activity, and can be stably operated for a long time and widely used.

BRIEF DESCRIPTION OF DRAWINGS

FIG. 5 is a diagram showing an TEM image, a particle diameter distribution, and a composition analysis result of the Pt—Co alloy-supported Ta-doped $SnO_2$ catalyst;

DETAILED DESCRIPTION

Figure 7A:
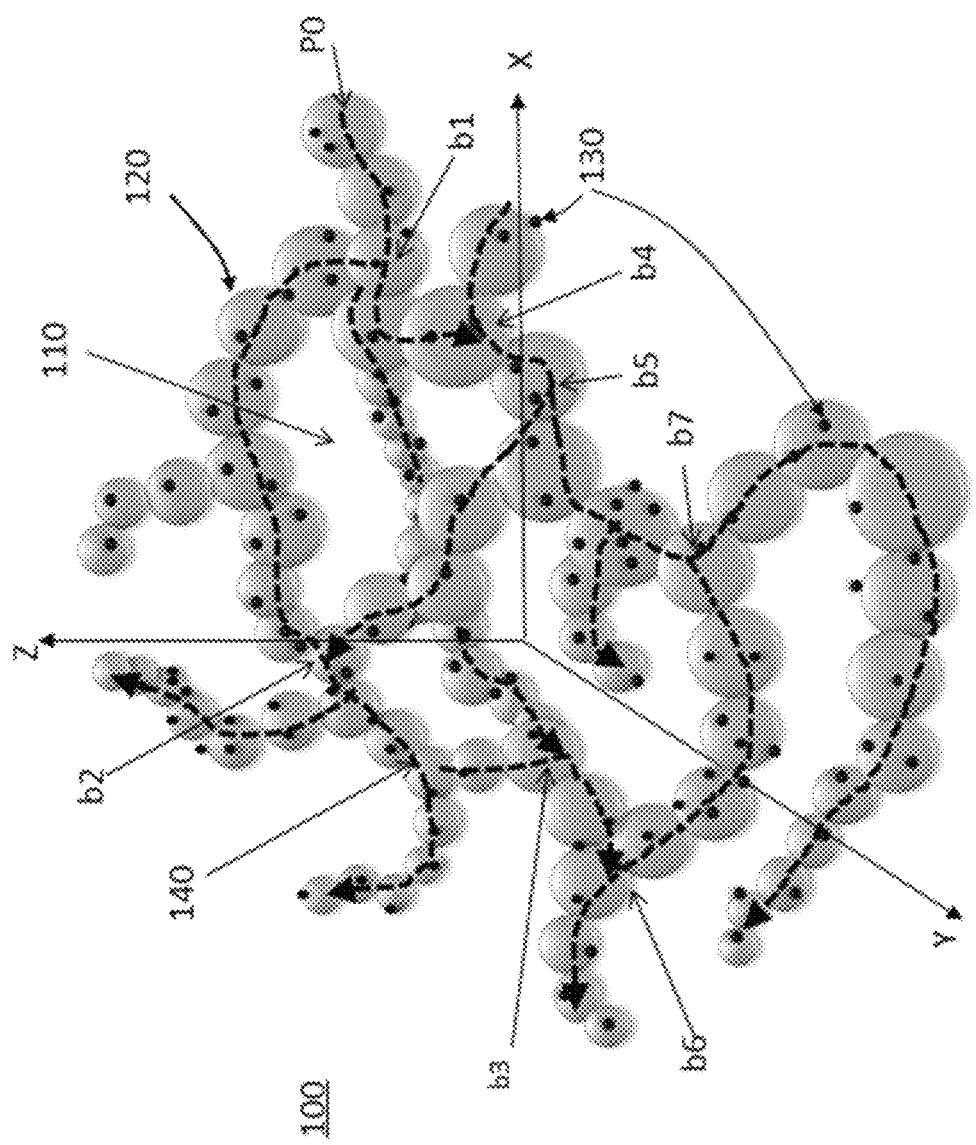
FIG. 7A is a drawing showing a model of a catalyst structure of the present invention.
Figure 7B:
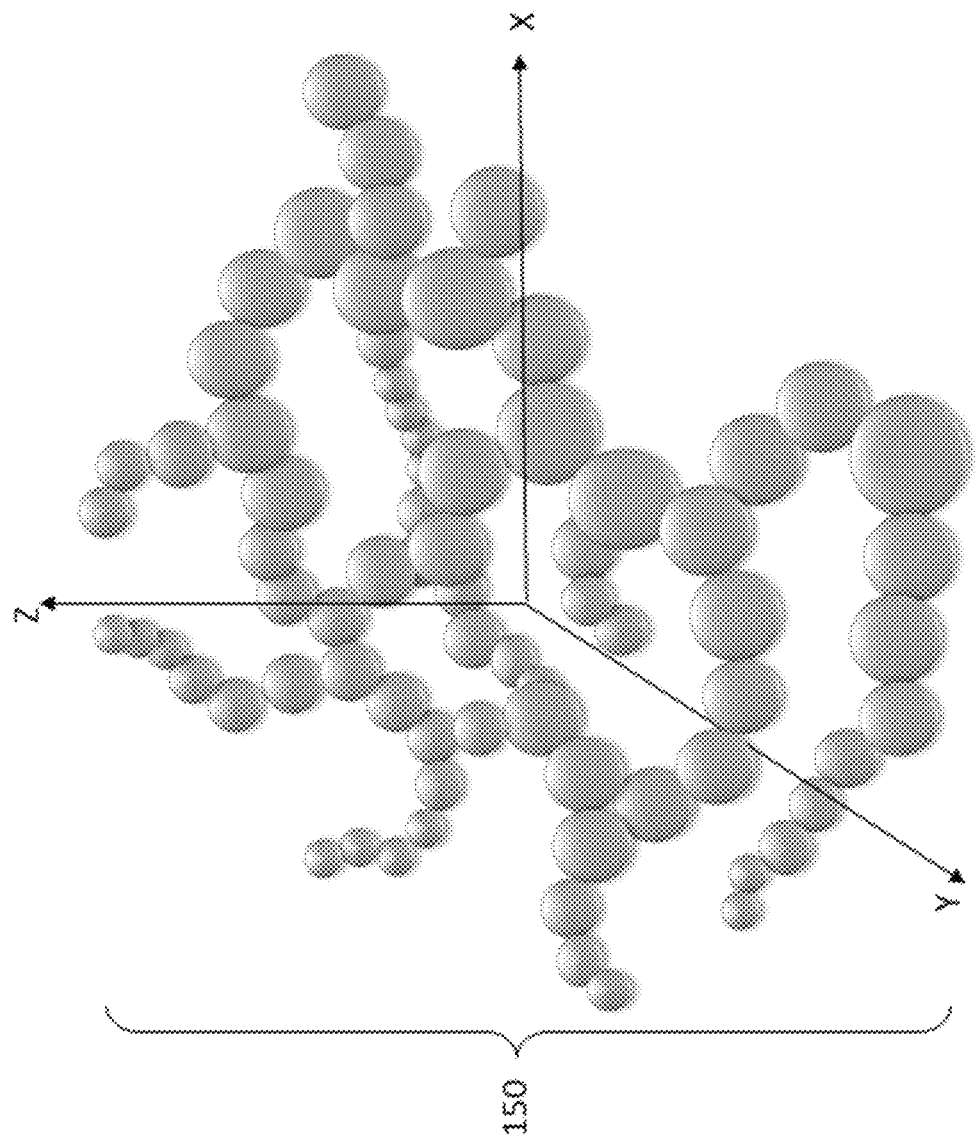
FIG. 7B is a drawing showing support particles in FIG. 7A.
Figure 7C:
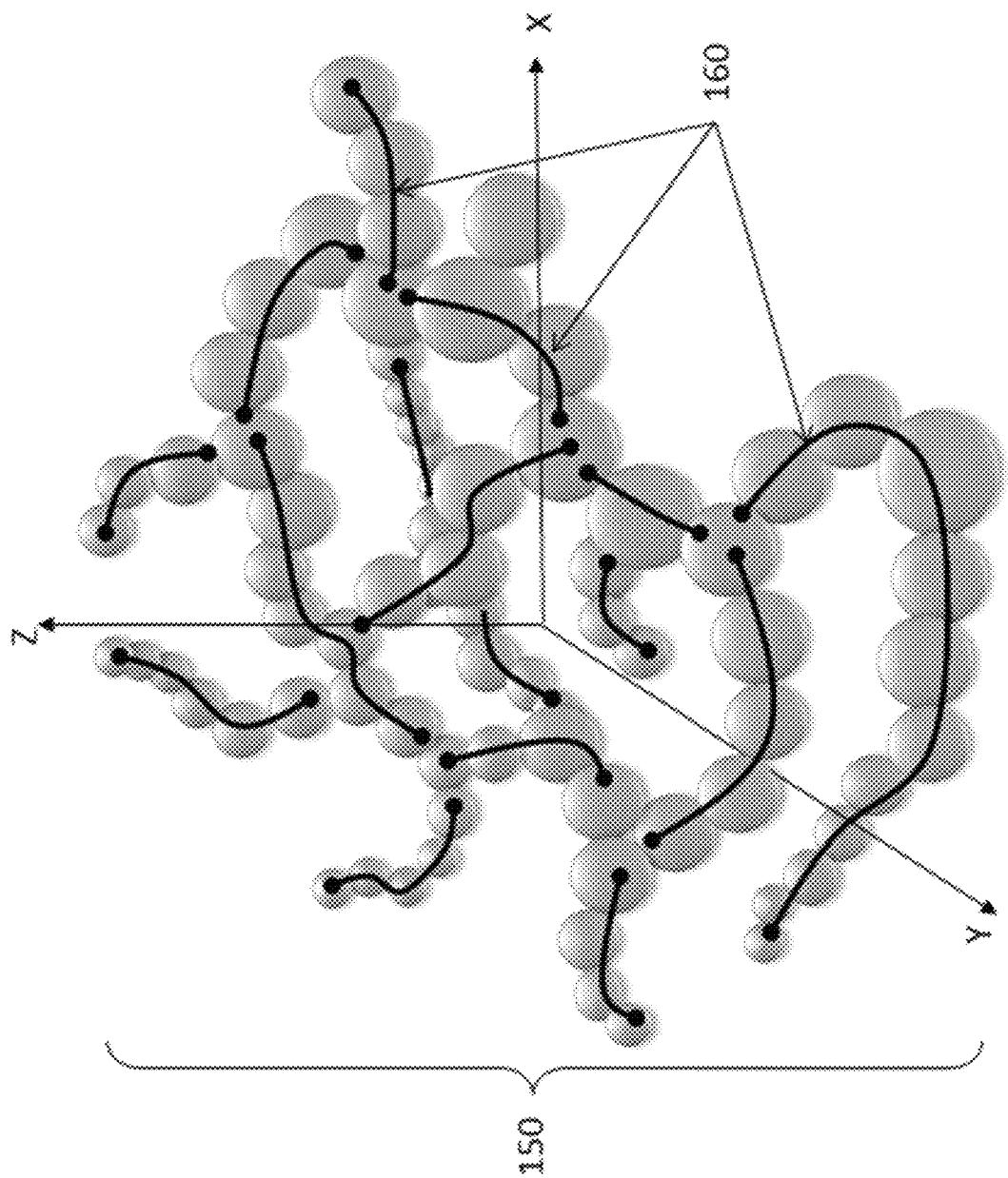
FIG. 7C is a drawing showing the state of the branches of the support particles in FIG. 7A.

FIG. 7A is a model drawing showing the structure of an alloy electrode catalyst 100 of the present invention. FIG. 7B is a drawing showing support particles 150 in FIG. 7A and is obtained by extracting only the support particles 150 included in the alloy electrode catalyst 100 from the model structure drawing of the alloy electrode catalyst 100 shown in FIG. 7A. FIG. 7C is a drawing showing the state of branches 160 of the support particles in FIG. 7A. The alloy electrode catalyst 100 of the present invention includes the support particles 150 consisting of crystallites 120 of multiple metal oxides (metal oxide crystallites) and serving as support and a precious-metal alloy 130 supported on the support particles. That is, the alloy electrode catalyst 100 includes the metal oxides serving as a support and the precious-metal alloy supported on the support. The precious-metal alloy is the main body of the catalyst. In the present specification, the support particles 150 and the precious-metal alloy 130 supported thereon will be collectively referred to as the alloy electrode catalyst 100, and the precious-metal alloy 130 as an alloy catalyst The precious-metal alloy includes platinum (Pt), which is a precious metal, and at least one of the transition elements. The at least one transition element is preferably cobalt (Co) or nickel (Ni), particularly preferably cobalt.

The support particles 150 have three-dimensional pores 110 surrounded by the branches 160 and holes between the branches. The branches 160 are portions obtained by separating the connected metal oxide crystallites 120 forming the support particles 150 as branches. The support particles 150 thus arranged three-dimensionally have a gas diffusion path through which oxygen serving as an oxidant and/or hydrogen serving as a fuel are diffused and transported onto the electrode catalyst (the alloy electrode catalyst). TEM images of alloy electrode catalysts of the present invention are shown in FIG. 5. Any of the alloy electrode catalysts in FIG. 5 uses Ta-doped $SnO_2$ the support particles 150. The TEM images in FIG. 5 are ones obtained by substituting four values, that is, 20, 25, 33.33, and 0 into x of $Pt_{100-x}Co x$ representing the precious-metal alloy 130 (and correspond to x=20, x=25, x=33.33, and x=0 from the left sequentially). More specifically, when x=20, $Pt_{80}Co_{20}$ ($Pt_4Co$) is used as the precious-metal alloy 130; when x=25, $Pt_{75}Co_{25}$ ($Pt_3Co$) as the precious-metal alloy 130; and when x=33.33, $Pt_{66.67}Co_{33.33}$ ($Pt_2Co$) as the precious-metal alloy 130. Note that an electrode catalyst corresponding to x=0 is a conventional electrode catalyst containing Pt alone for comparison.

Figure 7D:
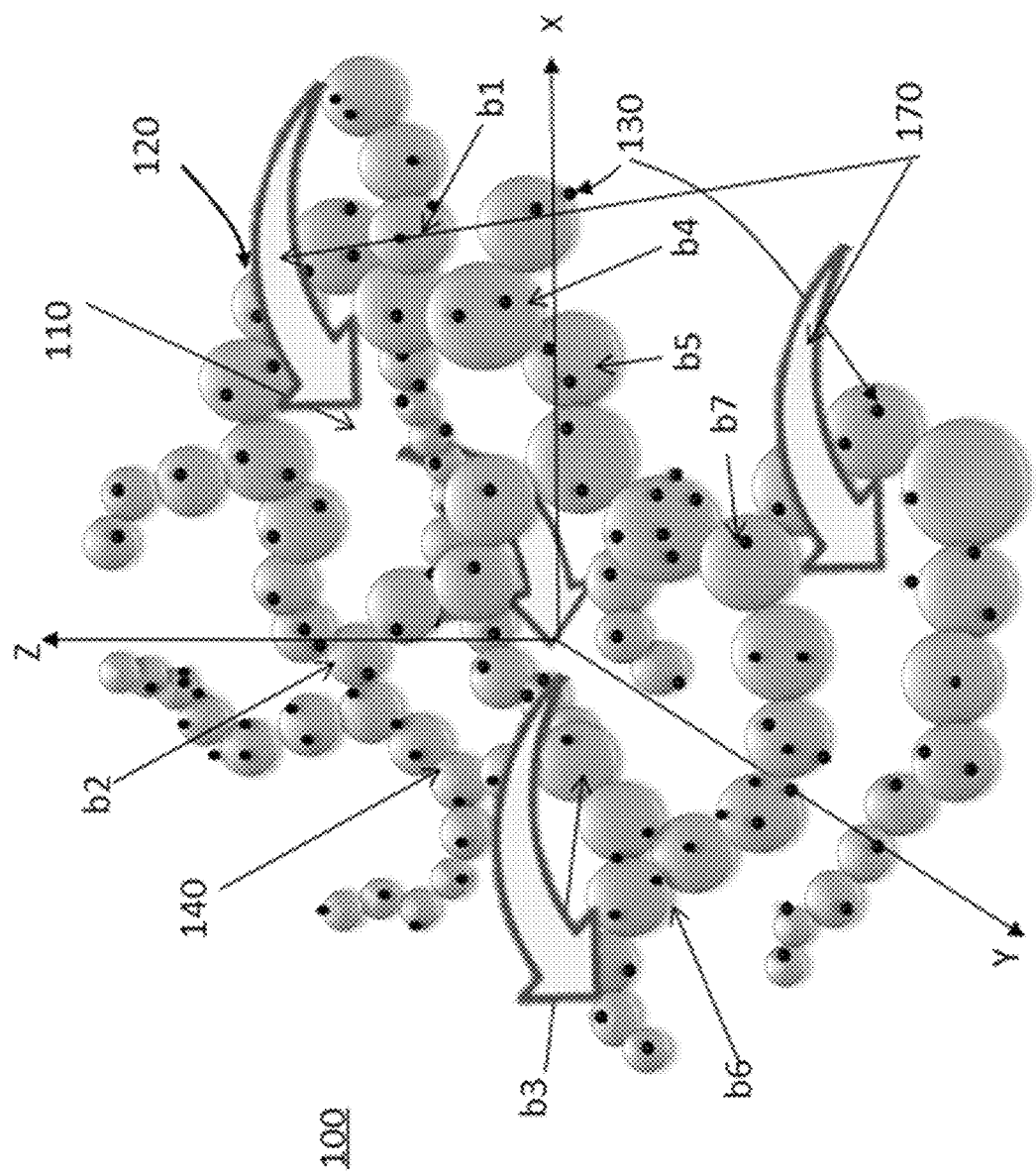
FIG. 7D is a drawing showing a gas diffusion path in FIG. 7A.

As shown as a structure model of the alloy electrode catalyst in FIGS. 7A to 7C, in the alloy electrode catalyst of the present invention, the support particles 150 have four holes: a first hole surrounded by branch connection points (may be simply referred to as bifurcation points or bifurcations) b1, b2, b5, b4, b1; a second hole surrounded by bifurcation points b1, b2, b3, b1; a third hole surrounded by bifurcation points b2, b3, b6, b7, b5, b2; and a fourth hole surrounded by bifurcation points b1, b3, b6, b7, b5, b4, b1. The surfaces surrounded by the bifurcation points of the holes (the first to fourth holes) are referred to as hole surfaces. Each pore 110 is a three-dimensional space surrounded by the four hole surfaces. As seen above, the support particles 150 have the multiple holes surrounded by the multiple bifurcation points at which the multiple branches are connected together. The support particles 150 also have the continuous three-dimensional spaces (the pores) surrounded by the multiple holes. Accordingly, these pores serve as a pass through which a gas such as oxygen or hydrogen is diffused (a gas diffusion path). FIG. 7D is a drawing showing a gas diffusion path in FIG. 7A. FIG. 7D shows an example of the gas diffusion path formed by the pores 110. As shown in FIG. 7D, the flow (the gas diffusion path) 170 of an oxidant (a gas), a fuel gas, or the like can flow in a desired direction through the pores 110. That is, the pores 110 serve as a gas diffusion path. Note that as a simple configuration, the alloy electrode catalyst of the present invention may simply have a single hole (e.g., the first hole surrounded by the bifurcation points b1, b2, b5, b4, b1). In this case, the alloy electrode catalyst has a pore 110 having a thickness equivalent to that of first hole metal oxide crystallites 120 corresponding to the surface of the first hole. As a simpler configuration, the support particles 150 may have one or more branches. Even in this case, the branches are present between the support particles 150 and prevent the support particles 150 from adhering to each other. Thus, the support particles 150 can have pores 110 thereamong. As seen above, in the electrode catalyst (the alloy electrode catalyst) including the multiple support particles containing the metal oxide and the precious-metal alloy supported on the support particles, the support particles may include one or more branches and have pores thereamong. Also, these configurations may be mixed.

The above holes may translate into closed curves (closed loops). Or, it can be said that the support particles 150 have the pores 110 surrounded by closed surfaces including the above multiple bifurcation points (e.g., the bifurcation points b1 to b7). The bifurcation points b1 to b7 can be interpreted as the centers of mass of the metal oxide crystallites forming the support particles 150 at which the branches are connected together, or may be interpreted as any points on the crystallites.

The support particles 150 of the alloy electrode catalyst of the present invention consist of the metal oxide crystallites 120 and have the property of passing electrons. As shown in FIGS. 7A to 7D, the support particles 150 have the multiple branches 160. The branches form a network through the bifurcation points (b1 to b7) at which the branches are connected together. These branches conduct electricity to each other. Thus, the branches 160 of the support particles 150 shown by dotted lines starting from point P0 in FIG. 7A form an electron conduction path 140.

The actual alloy electrode catalyst of the present invention uses a predetermined amount of the particles of the alloy electrode catalyst 100 shown in FIG. 7A. That is, the particles of the alloy electrode catalyst 100 are in contact with each other and as a whole form an electron conduction path.

Figure 11:
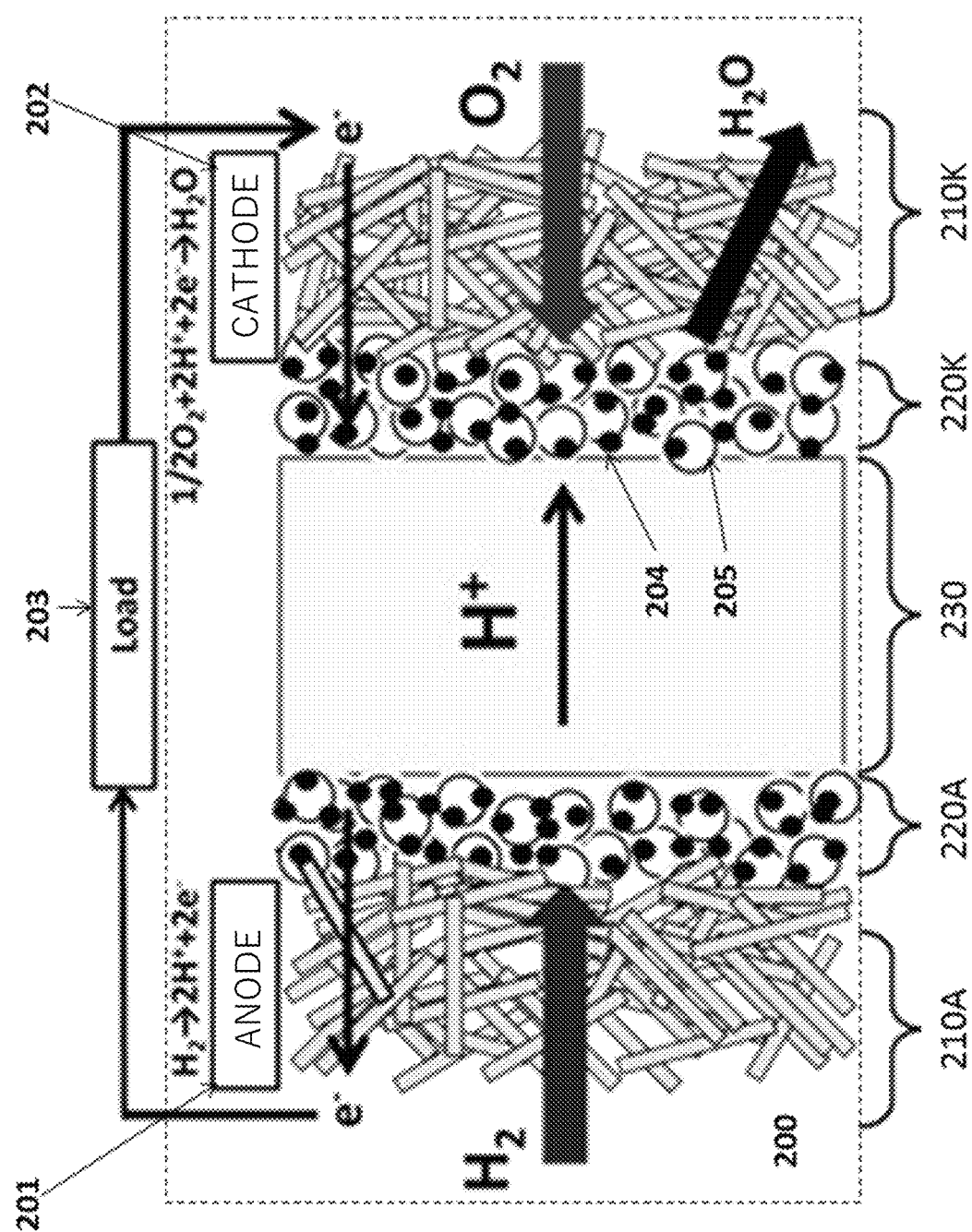
FIG. 11 is a drawing showing a model of a fuel cell of the present invention.

FIG. 11 is a model drawing showing a fuel cell of the present invention. In a fuel cell 200 in FIG. 11, a catalyst layer 220A and a gas diffusion layer 210A on the anode (201) side and a catalyst layer 220K and a gas diffusion layer 210K on the cathode (202) side are opposed to each other with an electrolyte membrane 230 therebetween. The anode-side gas diffusion layer 210A, anode-side catalyst layer 220A, electrolyte membrane 230, cathode-side catalyst layer 220K, and cathode-side gas diffusion layer 210K are arranged in this order. Each catalyst layer (220A, 220K) includes a catalyst 204 and a support 205 having the catalyst 204 supported thereon and serves as electrode. In the polymer electrolyte fuel cell 200, a load 203 is connected between the anode 201 and cathode 202. Thus, power is outputted to the load 203. The fuel cell 200 of the present invention uses the alloy electrode catalyst 100 as the cathode-side catalyst layer 220K. Accordingly, the catalyst 204 is a precious-metal alloy and includes Pt and a transition element (particularly Co), and the support 205 is a metal oxide (e.g., Ta-doped $SnO_2$ as described below).

Hereafter, a method for preparing the alloy electrode catalyst of the present invention will be outlined.

Method for Preparing Support

Among methods available to prepare metal oxide particles (support particles) 150 used in the alloy electrode catalyst of the present invention are coprecipitation, sol-gel, and spray pyrolysis. Among these, spray pyrolysis using a chemical flame based on propane, methane, acetylene, hydrogen, nitrous oxide, or the like is preferred. In this method, particles are prepared by previously preparing an organic solution containing metal ions serving as a raw material, transforming the organic solution into a mist using a sprayer using oxygen or nitrogen, and injecting the mist to a chemical frame.

Supporting Method

Among methods available to support 1-to-20-nm particles of the precious-metal alloy 130 on the metal oxide (the support particles 150) thus obtained are reverse micelle, the colloidal method, and impregnation. For example, a supporting method using the colloidal method includes preparing a dispersion by dispersing, in an aqueous solution, platinum-alloy colloidal particles formed by the colloidal method and adding and mixing platinum-alloy colloidal particles to the prepared dispersion so that the colloidal particles are adsorbed on the support particles (metal oxide) 150. The support particles having the colloidal particles adsorbed thereon can be separated from the dispersion medium through filtration and drying. Then, the support particles having the operated colloidal particles adsorbed thereon are heated to give an electrode catalyst (an alloy electrode catalyst) in which the 1-to-20-nm precious-metal alloy particles are supported on the support particles. While the precious-metal alloy has been described above, these methods can also be applied to a precious-metal support.

Metal Oxide

Next, the metal oxide particles (the support particles 150) of the present invention will be described in detail. This material (the support particles 150) is a solid solution including at least two elements: a main-component element (a first element) and an element (a second element) having a different valence from the main-component element. The main-component element includes at least one element selected from the Group 14 elements represented by tin and the transition metal elements represented by titanium. The element having a different valence from the main-component element includes at least one element selected from the rare-earth elements represented by yttrium, the Group 5 elements represented by niobium and tantalum, the Group 6 elements represented by tungsten, and the Group 15 elements represented by antimony. Since the metal oxide particles (the support particles 150) are required to be resistant to strong acidity, the particles preferably contain at least one of titanium and tin.

In an Example described below, tin is used as a main element, and tantalum is used as an element having a different valence from tin, but tin or tantalum need not be necessarily used. Since many metal oxides or nitrides increase their conductivity by adding an additive element or the like thereto, a main element or the like may be selected from a wide variety of options. In any case, a main component is preferably an element that can have high conductivity.

Even a support that has excellent corrosion resistance but has slightly lower conductivity can exhibit sufficient electrode reaction performance by mixing or adding carbon to the support. On the other hand, the metal oxide particle support of the present invention has conductivity and therefore can be used as a catalyst support for electrodes without having to contain carbon.

Precious-Metal Alloy Catalyst

A precious-metal alloy catalyst of the present invention will be described below. A precious metal contained in a precious-metal alloy serving as a catalyst is preferably platinum (Pt). If a platinum alloy has a particle diameter of less than 1 nm, the platinum alloy is dissolved as the electrode reaction proceeds; if a platinum alloy has a particle diameter of more than 20 nm, the electrochemical active surface area decreases, resulting in the failure to obtain desired electrode performance. The amount of a platinum alloy supported is preferably 1 to 50% by weight.

As described above, a material contained in an alloy catalyst (a precious-metal alloy) with platinum (Pt) is preferably a transition element. The reason is that a transition element has strong locality and includes d electrons that easily form chemical bonds with admoleculaes. Among others, cobalt (Co) and nickel (Ni) have high d-band centers. In particular, cobalt (Co) is one of elements having the highest d-band center. For this reason, it is conceivable that the inclusion of Co facilitates the oxygen reduction reaction.

Next, Examples of the alloy electrode catalyst of the present invention will be described.

Example 1

Pt—Co Alloy-Supported Ta-Doped $SnO_2$ Catalyst

In the present Example, Ta-doped $SnO_2$ obtained by doping tin oxide ($SnO_2$) with tantalum (Ta) in order to increase conductivity was used as support particles. For example, a Pt catalyst supported on dopant-free tin oxide particles can be used as an electrode catalyst without having to add carbon. Although this Pt catalyst has high durability at high potential, it has the following disadvantages: the catalyst layer fails to obtain required conductivity; the effective surface area of Pt indicating electrochemical activity is small; and when it is used in a fuel cell, high current density is not obtained. A dopant for improving the conductivity of tin oxide is selected from the Group 5 elements represented by niobium (Nb), the Group 15 elements represented by antimony (Sb), and others. In particular, tantalum (Ta) is preferred.

In the present Example, a metal oxide support was prepared using the flame method (to be discussed later). Typically, an oxide, nitride, or carbide particle aggregate is transformed into particles in a process such as pulverization. As the particles become smaller, the contacts between the particles are increased. However, the particles easily move away from each other even if an external force or the like is not applied thereto. As a result, even if a dopant is injected to improve the conductivity of the support particles, the following problems remain: the resistance of the particle aggregate is increased; a sufficient amount of electrons cannot be supplied to the catalyst particles containing a precious metal; and the catalyst or catalyst layer cannot exhibit sufficient activity. On the other hand, if particles are prepared in a process such as the liquid-phase method, the aggregation of the particles proceeds due to the high-temperature heat treatment for crystallization and thus reduces the pores, although the contacts may be fused and bonded together. Thus, the continuous connections of the pores, or the holes are significantly reduced. As a result, as the amount of power generated by the fuel cell is increased, the amount of oxidant and fuel gas diffused in the catalyst layer becomes insufficient, thereby reducing the power generation performance.

For this reason, in the present Example, the inventors prepared a Pt alloy catalyst (a precious-metal alloy)-supported metal oxide having a structure as shown in FIGS. 7A to 7D in order to exhibit high catalytic activity, as well as to improve durability at high potential.

Figure 1:
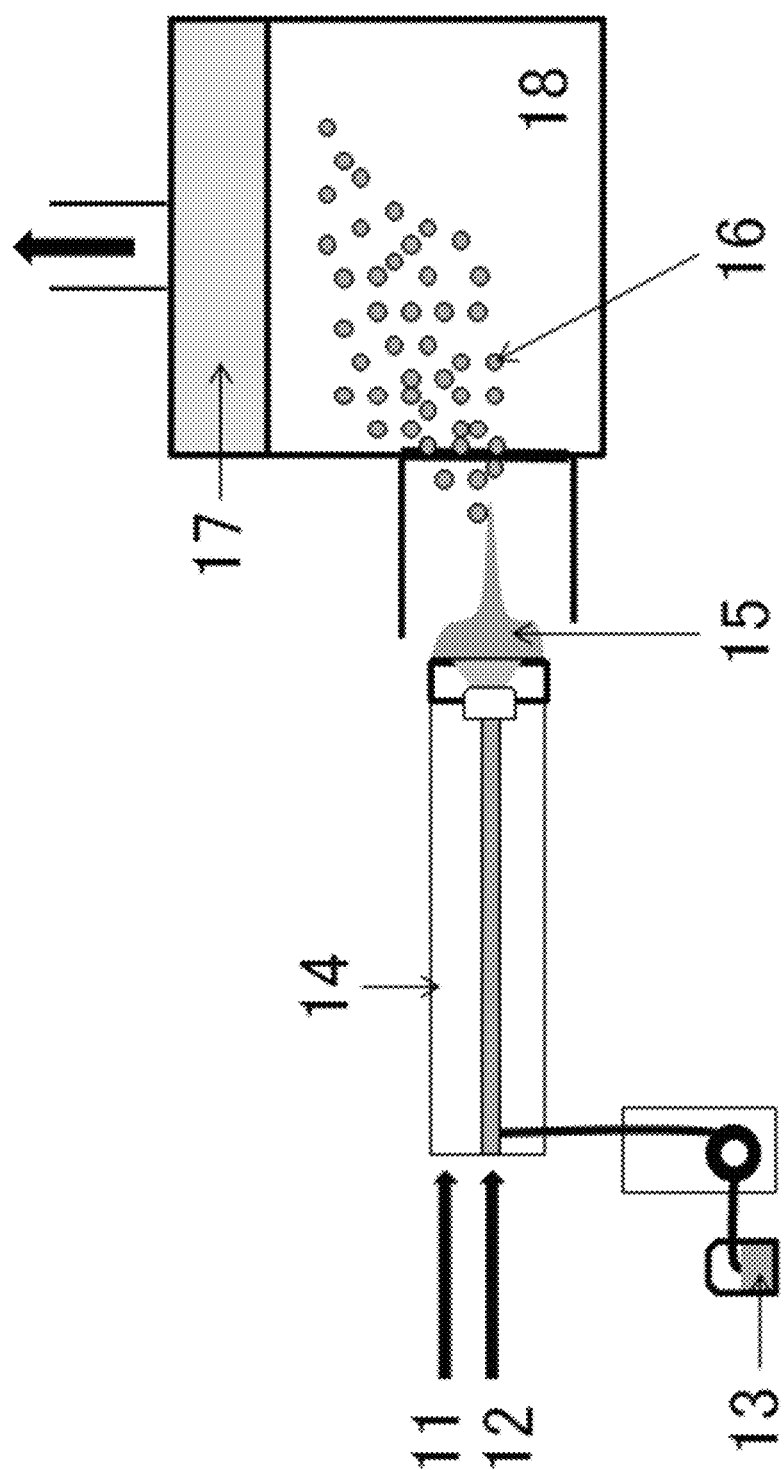
FIG. 1 is a schematic diagram showing a flame-method device.
Figure 2:
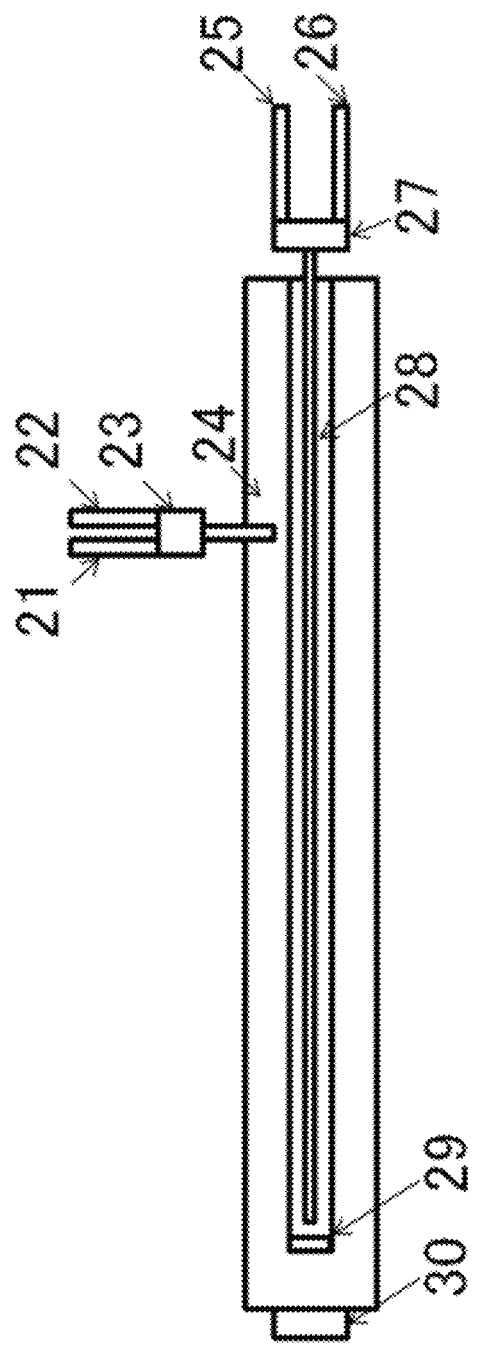
FIG. 2 is a diagram showing the structure of a spray nozzle.

First, the preparation of a support will be described. FIG. 1 is a schematic diagram of a flame-method device used in the present Example. FIG. 2 is a diagram showing the structure of the spray nozzle of the flame-method device shown in FIG. 1. In the preset Example, a flame-method preparation device shown in FIG. 2 was used. Oxygen and air, and a propane gas were injected from gas inlets 21 and 22 of the spray nozzle shown in FIG. 2 at flow rates of 14 L/min (0.5 MPa) and 1 L/min (0.05 MPa), respectively, and mixed in a gas mixer 23 in FIG. 2. The mixed gas was injected to a stainless tube 24 so that a chemical flame is generated in a burner 30. The metal raw-material is preferably dissolved in an organic solvent represented by turpentine. In the present Example, tin octylate and tantalum octylate were used. Tin octylate and tantalum octylate may be mixed at any mixing ratio. In the present Example, a mineral turpentine solution mixed at a metal molar ratio of 0.96:0.04 was injected to a solution inlet 25 at a rate of 1 to 10 g/min. The mineral turpentine solution was then passed through a mixer 27 and stainless tube 28 using air, nitrogen, or oxygen supplied from a carrier gas inlet 26. The mineral turpentine solution was then transformed into a mist through a fluid nozzle, an air nozzle, and a retainer cap 29 and then injected to a chemical flame in the burner 30. The temperature of the chemical flame was increased to 1000° C. or more by the combustion heat of the propane gas and mineral turpentine, and a Ta-doped $SnO_2$ powder was prepared in the chemical flame. The prepared Ta-doped $SnO_2$ powder had pores 110 as described above. The prepared powder was recovered by a filter 17. In the present Example, the amount of the powder recovered was 20 g per hour. In FIG. 1, 11 represents air; 12 represents a fuel gas (propane)/oxygen; 13 represents a raw-material solution; 14 represents a spray nozzle (corresponding to FIG. 2); 15 represents a chemical flame; 16 represents a primary particle aggregate (nanoparticles); 17 represents primary particle aggregate recovery filter (a nanoparticle recovery filter); and 18 represents a recovery container.

The Ta-doped $SnO_2$ powder consisted of crystallites having sizes of 3 to 60 nm, and the most adjacent oxide particles were bonded together (necking) continuously, forming an electron conduction path. The conductance of the powder measured under a pressure of 19 MPa in accordance with the JIS standard (JIS K 7194) was $1.2 \times 10^{-3}$ S/cm. Also, the relationship between the pressure and conductance was measured to measure the buckling point of the support powder. The pressure of the buckling point was 50 MPa. By measuring the pressure of the buckling point, the most adjacent oxide particles were confirmed to be fused and bonded together.

As shown in Formulas (1) and (2) above, in a fuel cell, hydrogen serving as a fuel and oxygen serving as an oxidant must be diffused through the catalyst layer and transported onto the catalyst surface. For this reason, the catalyst layer is required to be conductive, as well as to be porous so that a gas diffusion path is formed. Also, to spread the use of fuel cells and to further improve performance, the catalyst layer is required to reduce the amount of Pt supported and increase catalytic activity compared to a Pt-supported carbon catalyst, which is a conventional catalyst.

Figure 6:
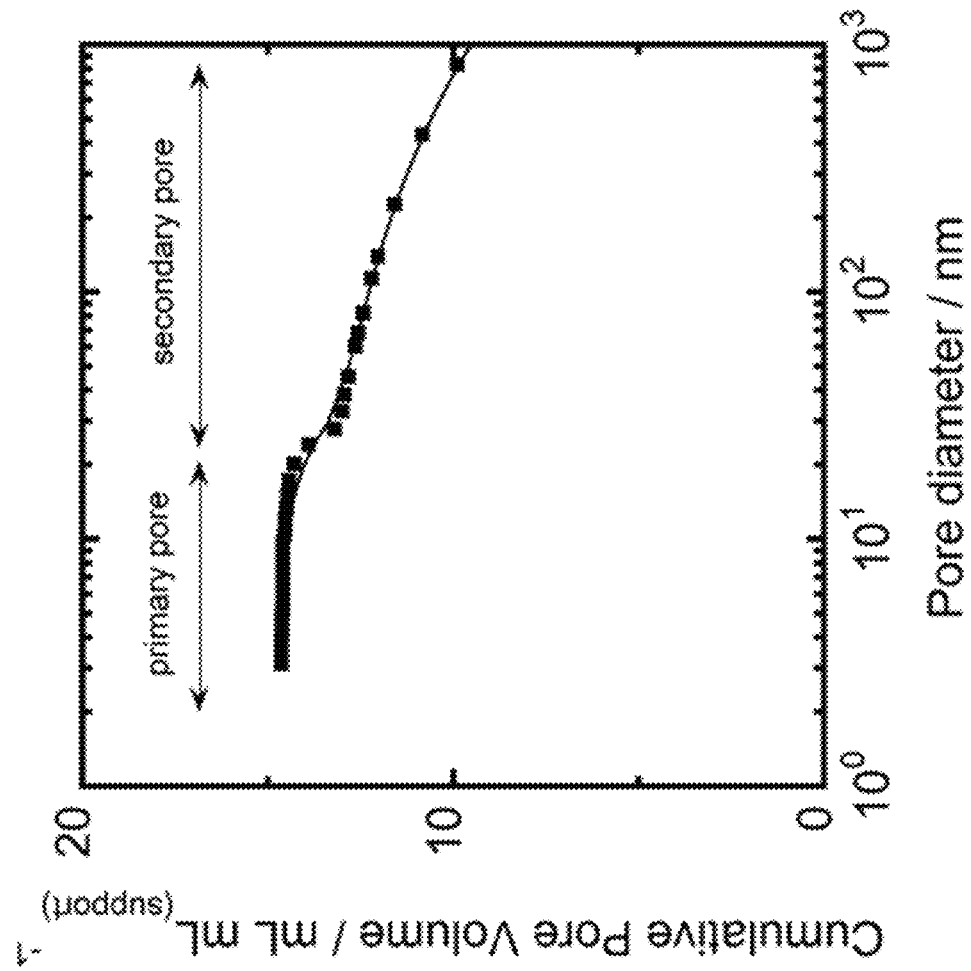
FIG. 6 is a diagram showing the pore distribution of the Pt—Co alloy-supported Ta-doped $SnO_2$ catalyst measured using a mercury porosimeter.

To identify the size of the pore 110, the volumes of the three-dimensional pores of the support were measured using a mercury porosimeter. The measurement result is shown in FIG. 6. Specifically, the volume per pore was obtained from the measured volume values and the number of pores, and a cumulative distribution of the diameter of a sphere having the same volume as the obtained volume is shown in FIG. 6. Thus, the obtained oxide support was confirmed to have pores (primary pores) of 11 nm or less and pores (secondary pores) of more than 11 nm. Also, it was found that a gas diffusion path is formed in the catalyst layer of the fuel cell. FIG. 6 shows a cumulative distribution of equivalent spherical diameters of the pores 110 according to the mercury penetration method.

Next, a method for supporting a Pt alloy will be described. Typical catalysts in which Pt is supported on an oxide or the like include a catalyst for water-gas shift reaction. On the other hand, an electrode catalyst for fuel cells is required to have more reaction active points and therefore is required to have a size of the order of 3 nm, which is smaller than a catalyst for water-gas shift reaction, and to be highly dispersed. Typically, a catalyst having a size of the order of 3 nm is prepared using the colloidal method.

To highly disperse and support the colloidal particles of the Pt-alloy catalyst (the precious-metal alloy) on the catalyst using the colloidal method, both sides must have electrostatic attractive forces. The electrostatic charge of the surface of the colloidal particles or the like can be evaluated using the zeta potential. The zeta potential of the colloid of the Pt-alloy catalyst (the precious-metal alloy) in an acidic solution is positive, becomes negative as pH is increased, and becomes −12.3 mV around pH=5.0. This potential becomes positive as Co, which is cations, is added.

On the other hand, the zeta potential of the Ta-doped $SnO_2$ powder having the Pt-alloy catalyst supported thereon is positive in the acidic-neutral region. Accordingly, the Pt colloid and Ta-doped $SnO_2$ powder exert electrostatic attractive forces, which allows the Pt colloid to be easily supported. However, if the Pt colloid contains cations such as Co, the potential of the colloid surface is shifted to a positive potential.

As a result, an electrostatic repulsive force works between the colloid and Ta-doped $SnO_2$ powder, making it difficult for the colloid to be supported. For this reason, it has been difficult to prepare an electrode catalyst for fuel cells in which a Pt-alloy catalyst (a precious-metal alloy) is supported on a Ta-doped $SnO_2$ powder, and only those in which a Pt-alloy catalyst is supported on a carbon support have been prepared. Also, as described in Takeoh Okanishi, Toshiaki Matsui, Tatsuya Takeguchi, Ryuji Kikuchi, Koichi Eguchi, *Applied Catalysis A*, 298, 2006, pp. 181-187 and Naoto Kamiuchi, Tomohiro Mitsui, Nobutada Yamaguchi, Hiroki Muroyama, Toshiaki Matsui, Ryuji Kikuchi, Koichi Eguchi, *Catalysis Today*, volume 157, issues 1-4, Nov. 17, 2010, pp. 415-419, even if a Pt and Pt alloy can be highly dispersed and supported on a tin oxide support, part of the tin oxide support would cover the surface of the Pt and Pt alloy and impair the electrochemical reaction that occurs on the Pt alloy surface. Accordingly, it has been difficult to prepare an electrode catalyst for fuel cells in which a Pt-alloy catalyst (a precious-metal alloy) is supported on oxide particles containing Sn as a main component, and only those in which a Pt-alloy catalyst is supported on a carbon support have been prepared.

Figure 3:
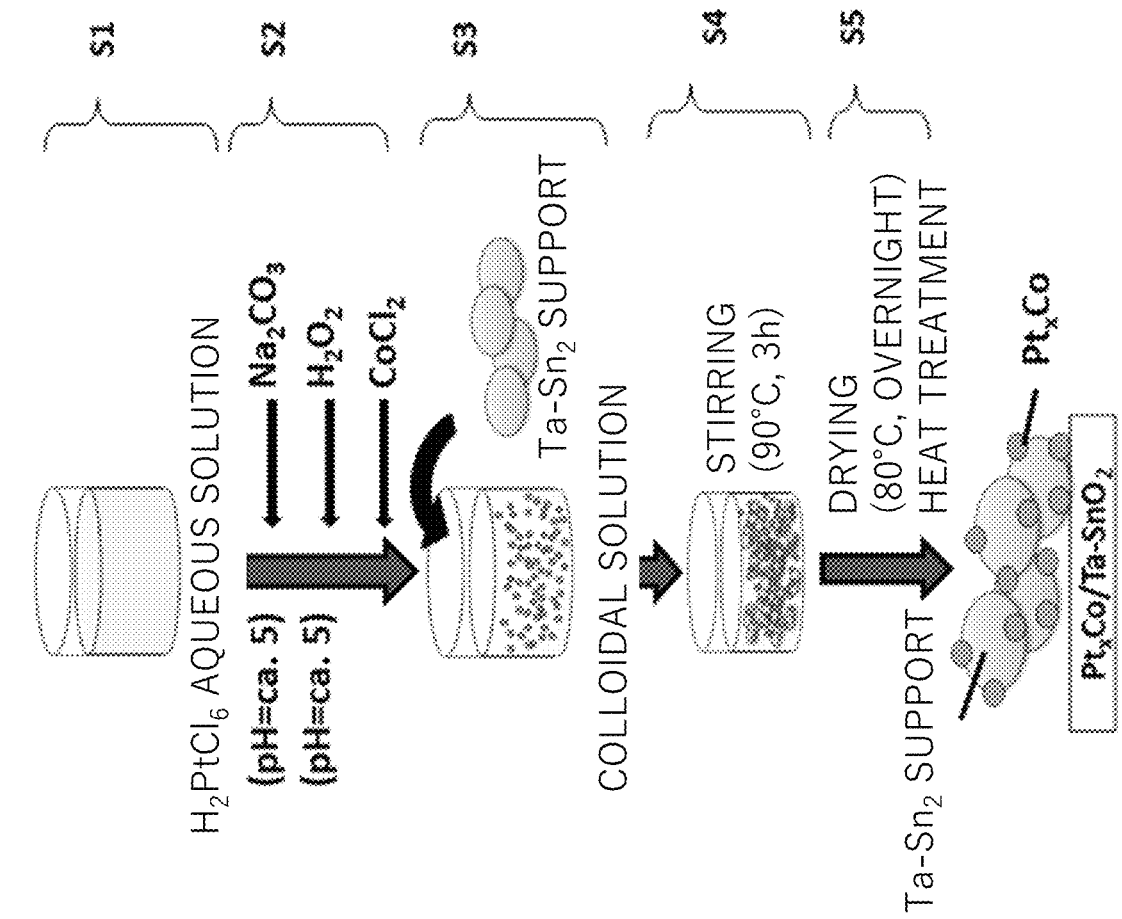
FIG. 3 is a flowchart showing a Pt supporting method.

To solve this problem, an attempt was made to support a Pt-alloy catalyst (a precious-metal alloy) on a Ta-doped $SnO_2$ powder in accordance with preparation steps shown in FIG. 3.

First, 0.57 mL of an aqueous solution of platinum chloride hexahydrate was dissolved in 38 mL of extra-pure water, and 1.76 g of sodium sulfite was added and stirred (step S1 in FIG. 3).

The resulting solution was diluted with 150 mL of water, and the pH of the solution was adjusted to 5 using NaOH. Then, 25 mL of hydrogen peroxide was added, and the pH was readjusted to 5 using NaOH. Further, a $CoCl_2$ solution [$CoCl_2$ (available from Kanto Chemical Co., Inc.)/15 mL of extra-pure water) was added dropwise at 2 mL min$^{-1}$ and stirred (step S2 in FIG. 3). The Co content of the Pt—Co alloy can be changed in accordance with the amount of the $CoCl_2$ solution added dropwise. In this experiment, $Pt_2Co$, $Pt_3Co$, and $Pt_4Co$ were prepared by changing the amount of the $CoCl_2$ solution added. Pt2Co, Pt3Co, and Pt4Co contained Co at atomic ratios of 33.33, 25, and 20, respectively. In the present specification, the Co content refers to the number of Co atoms with respect to the number of all Pt and Co atoms of 100.

To the above dispersion was added a dispersion obtained by dispersing 0.50 g of Ta-doped $SnO_2$ in 15 mL of extra-pure water (step S3 in FIG. 3), and the resulting dispersion was stirred at 90° C. for 3 h (step S4 in FIG. 3). The dispersion was then cooled to room temperature, filtered, and washed with extra-pure water and alcohol, dried at 80° C., and heat-treated (step S5 in FIG. 3). Thus, a Pt—Co alloy-supported Ta-doped $SnO_2$ catalyst powder was obtained.

Figure 4:
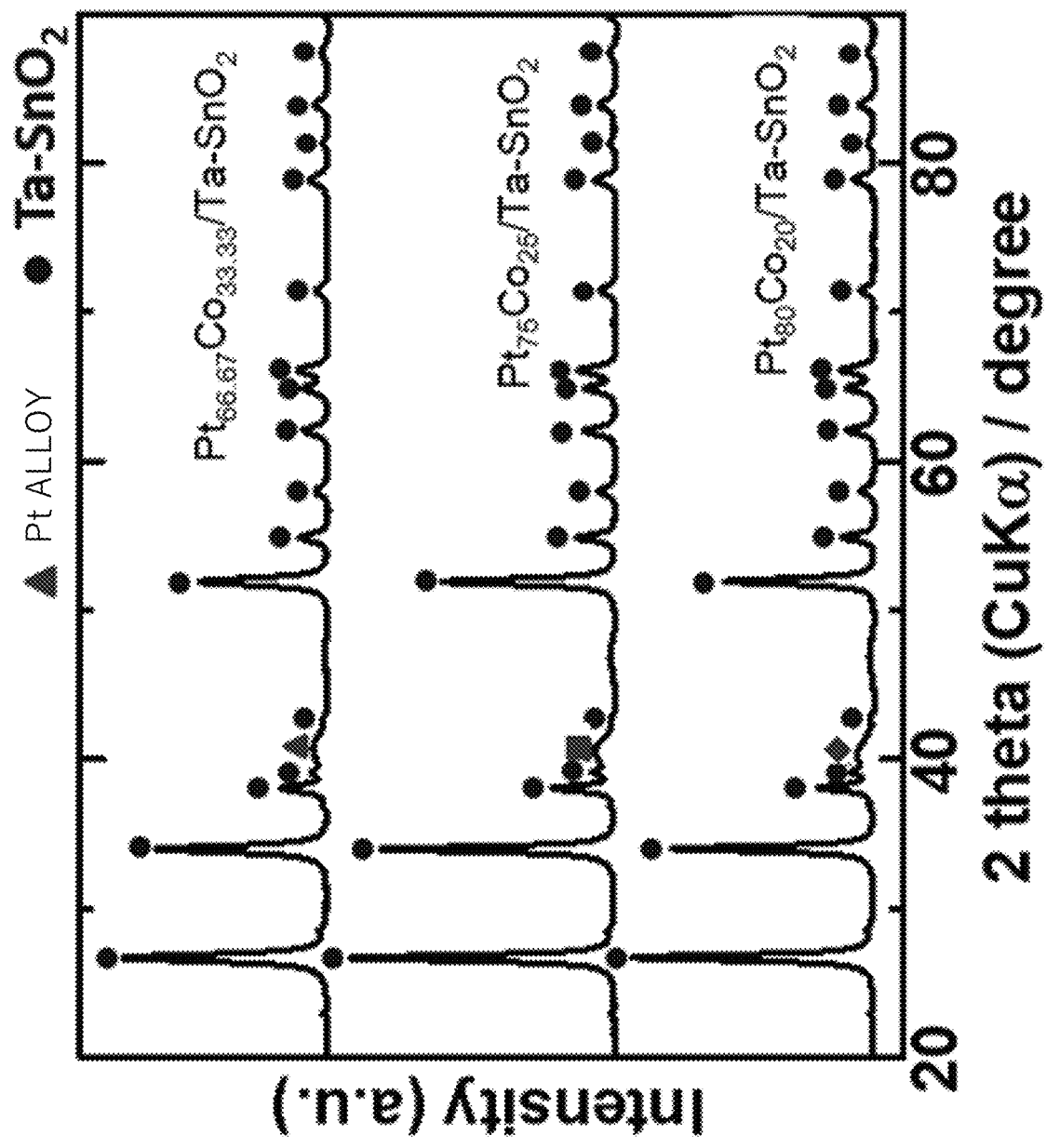
FIG. 4 is a diagram showing an XRD pattern of a Pt—Co alloy-supported Ta-doped $SnO_2$ catalyst.

Using XRD (FIG. 4), the obtained Pt—Co alloy-supported Ta-doped $SnO_2$ powder was confirmed to be a single phase. Note that in FIG. 4, a triangle, a square, and a rhombus each represent a Pt alloy, and circles represent the diffraction peaks of Ta—$SnO_2$.

A profile measured using XRD was compared with a JCPDS card in which the peak positions (literature values) of oxides or the like are listed. The peaks were confirmed to belong to the Ta-doped $SnO_2$ or Pt—Co alloy, and no peak belonging to other materials was identified. Accordingly, the obtained powder was determined to be formed of the Ta-doped $SnO_2$ or Pt—Co alloy.

Further, the shape of the powder was observed using a transmission electron microscope (TEM) (see FIG. 5). The Pt—Co alloy was uniformly dispersed and supported on the Ta-doped $SnO_2$. The amount of Pt and Co supported was determined using high-frequency induction heating emission spectrometry (ICP), and the Co content and the average particles diameter (calculated by averaging the diameters of 500 Pt—Co alloy particles from an image) are shown in FIG. 5.

Figure 12:
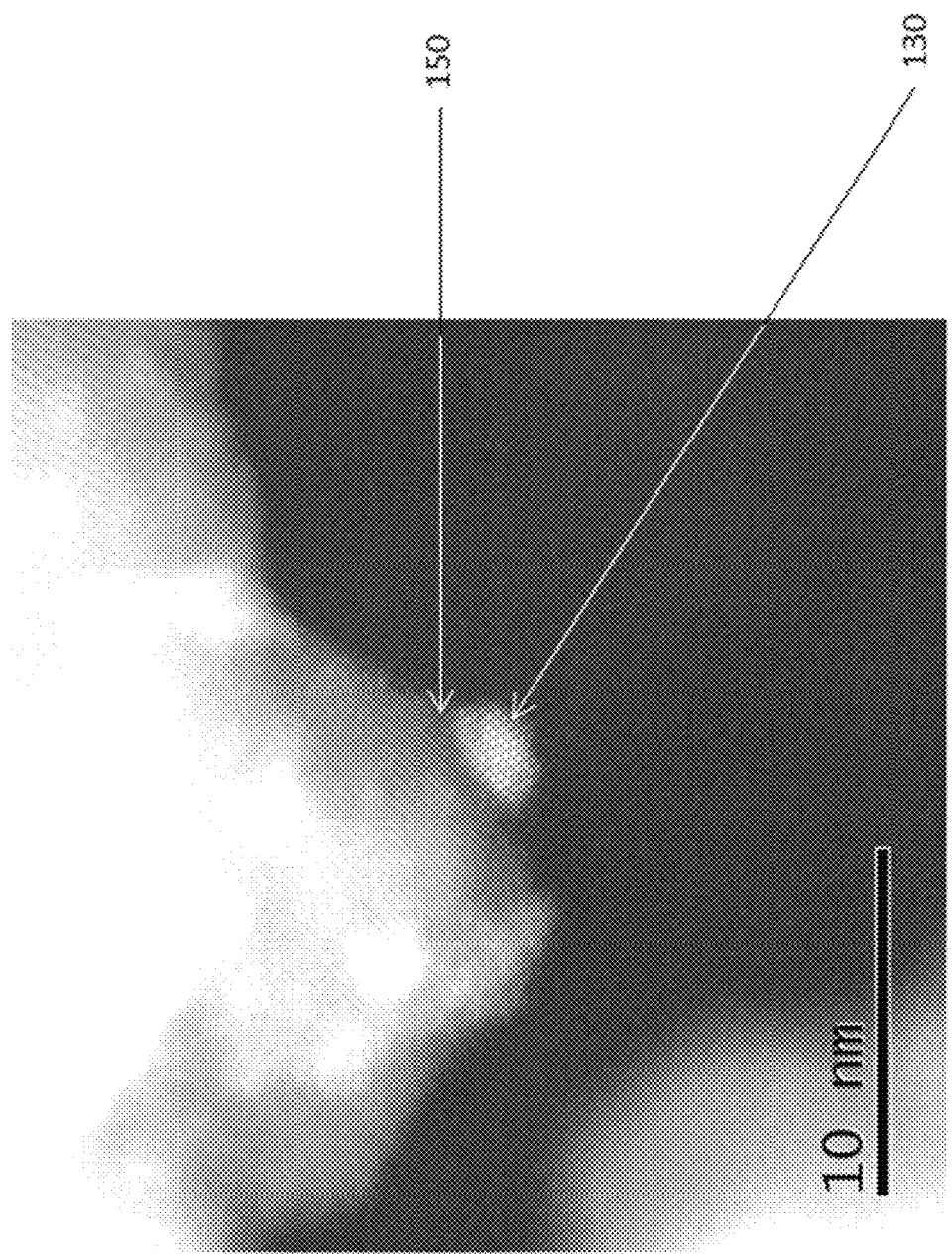
FIG. 12 is a diagram showing a high-resolution transmission electron microscopy (HRTEM) image of the Pt—Co alloy-supported Ta-doped $SnO_2$ catalyst.

A high-resolution transmission electron microscopy (HR-TEM) image of the catalyst heat-treated in step S5 in FIG. 3 is shown in FIG. 12. As shown in FIG. 12, the support particles 150 and precious-metal alloy 130 of this catalyst can be identified. As shown in FIG. 12, part of the alloy catalyst (the precious-metal alloy) heat-treated in step S5 was confirmed to be aligned with the support. As used herein, the term "aligned" means that the atomic arrangement of the alloy catalyst (the precious-metal alloy) is parallel with the atomic arrangement of the support particles. More specifically, the atoms of the Pt alloy and the atoms of the oxide particles are aligned with each other. This means that strong metallic bonds are formed on both sides. This prevents the movement of the Pt-alloy catalyst (the precious-metal alloy) on the oxide particles, which is one of the causes of the degradation of catalysts, thereby improving the durability of the catalyst.

Also, when portions in which the contact surfaces of the alloy catalyst (the precious-metal alloy) and oxide particles can be observed was seen in the HRTEM image (FIG. 12), it was confirmed that many alloy catalysts (the precious-metal alloy) are in the form of semicircles or polyhedrons and that the long diameters thereof approximately match the long diameters of the contact surfaces of the alloy catalysts (the precious-metal alloy) and oxide particles. On the other hand, when portions in which the contact surfaces of alloy catalysts (the precious-metal alloy) and carbon particles can be observed is seen in an HRTEM image of a conventional Pt-alloy catalyst (a precious-metal alloy) supported on carbon, many Pt-alloy catalysts (precious-metal alloy) are in the form of spheres or polyhedrons, but the long diameters thereof hardly exceed the long diameters of the contact surfaces. As seen above, the Pt-alloy catalyst (the precious-metal alloy) and oxide particles have larger contact surfaces; the surfaces on which metallic bonds occur are expanded; and the catalyst durability is improved. As described above, the long diameters of the particles of the Pt-alloy catalyst (the precious-metal alloy) identified in an electron microscope image are preferably 1 to 20 nm, more preferably 1.5 to 10 nm, most preferably 1.5 to 5 nm. FIG. 12 indicates that the particles of the Pt-alloy catalyst (the precious-metal alloy) of the present Example fall within these desired ranges.

The reason why the Pt alloy colloid was highly dispersed and supported on the Ta-doped $SnO_2$ powder is not clear at the present time. However, it seems that anions, such as OH ions and Cl ions, contained in NaOH and $CoCl_2$ introduced as alkali and salt have an influence. The inventors repeatedly made prototypes on the basis of these considerations and then succeeded in supporting a Pt-alloy catalyst (a precious-metal alloy) on a Ta-doped $SnO_2$ powder, which has been difficult, by using the above method.

Figure 8:
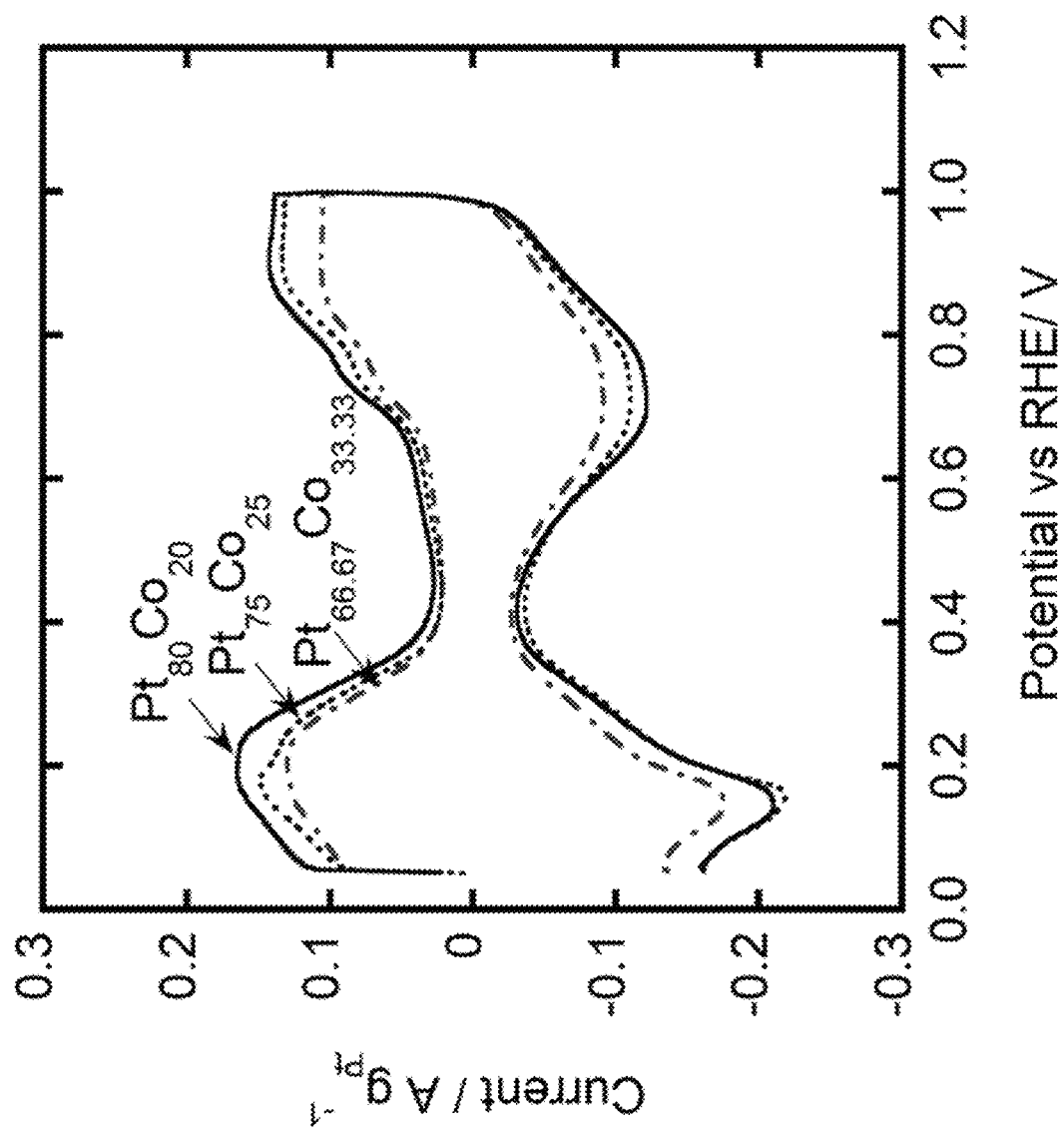
FIG. 8 is a cyclic voltammogram of the Pt—Co alloy-supported Ta-doped $SnO_2$ catalyst.
Figure 9:
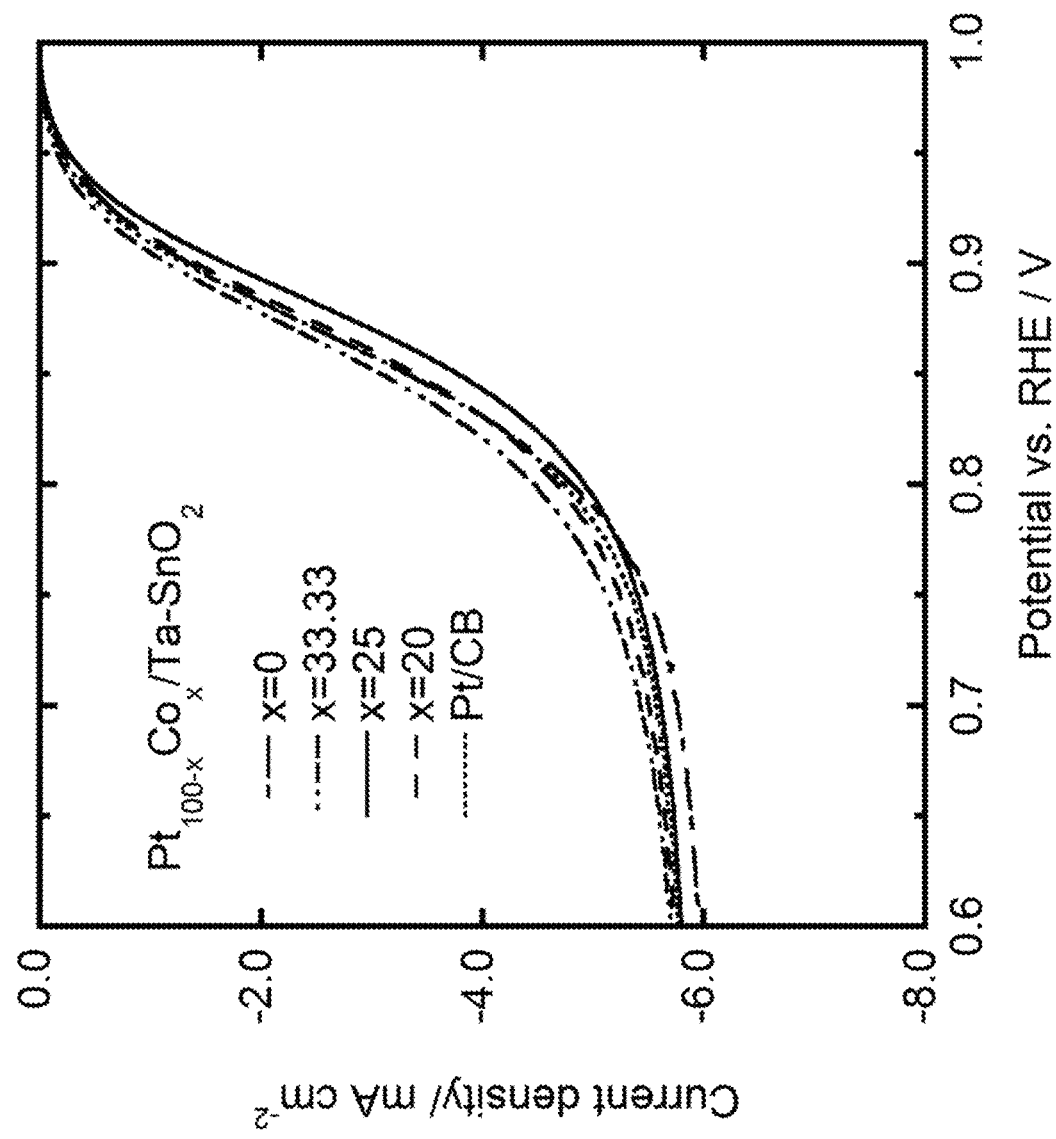
FIG. 9 is a linear sweep voltammogram of the Pt—Co alloy-supported Ta-doped $SnO_2$ catalyst.
Figure 10A:
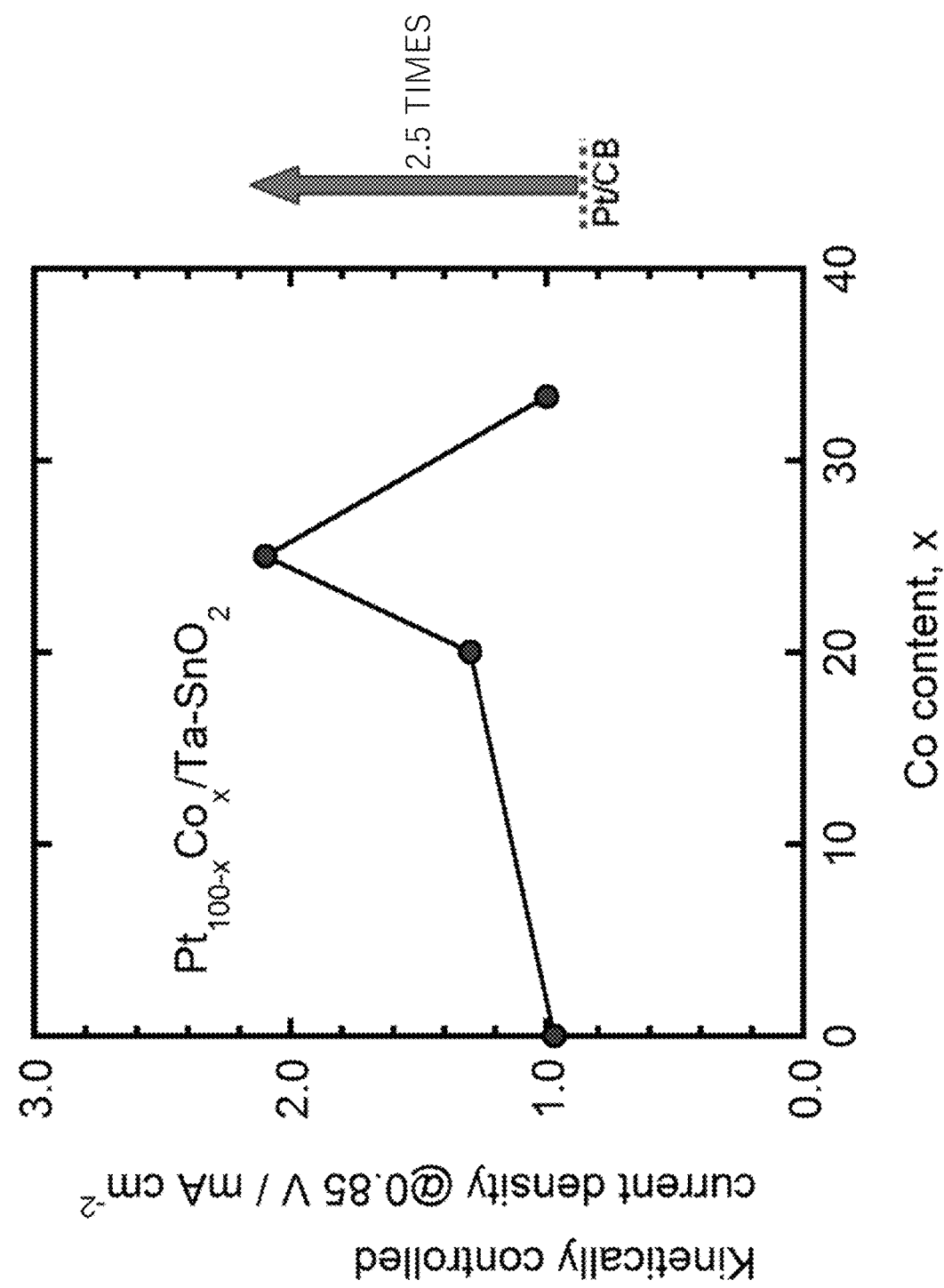
FIG. 10A is a diagram showing the catalytic activity (the area ratio activity) of the Pt—Co alloy-supported Ta-doped $SnO_2$ catalyst.
Figure 10B:
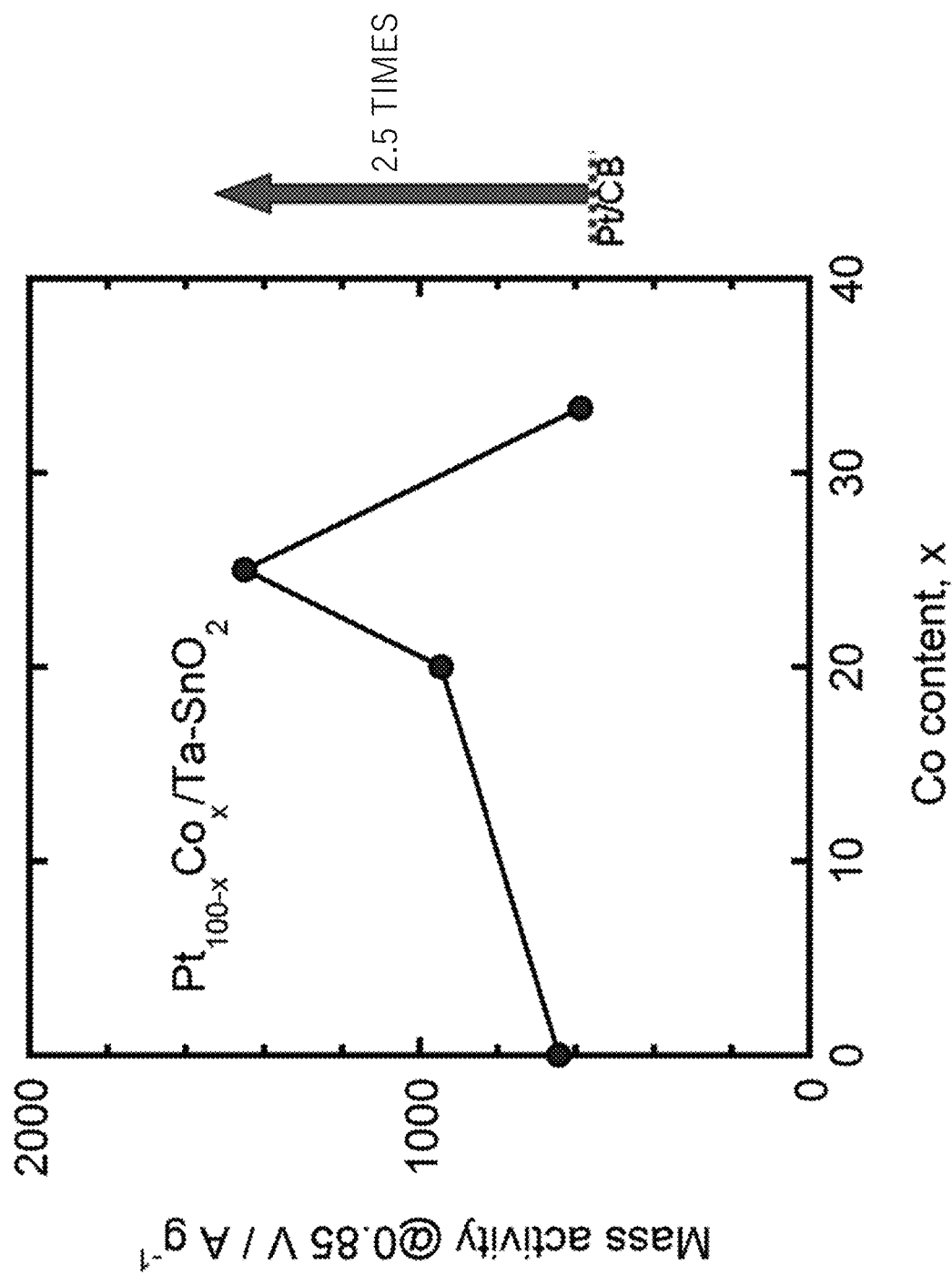
FIG. 10B is a diagram showing the catalytic activity (the mass activity) of the Pt—Co alloy-supported Ta-doped $SnO_2$ catalyst.

The electrode powders obtained using the above method were CV-measured using a rotating ring disk electrode. Zero point one mol/1 of an aqueous solution of perchloric acid was used as an electrolyte solution, and a reversible hydrogen electrode (RHE) was used as a reference electrode. The scanning speed of the potential was set to 0.1 V/sec. To check the stability of the electrode materials at 0.9 V or more, sweep was performed in a potential range of 0.05 to 1.3 V 100 times and then CV was measured in a potential range of 0.05 to 1.0 V. These measurement steps were regarded as one set, and 5 sets were performed. The CV measurement result of the Pt—Co alloy-supported Ta-doped $SnO_2$ catalyst is shown in FIG. 8 (FIG. 8 is a cyclic voltammogram of the Pt—Co alloy-supported Ta-doped $SnO_2$ catalyst). As a comparison, the CV measurement result of commercially available Pt-supported carbon swept in a potential range of 0.05 to 1.0 V is also shown in FIG. 8. Platinum effective reaction areas (ECSA) obtained from peak areas attributable to oxygen adsorption waves at 0.05 to around 0.4 V are shorn in Table 1. Linear sweep voltammogram was measured (FIG. 9); the activity dominant current density (the area ratio activity) and mass activity at 0.85 V were obtained from a Koutecky-Levich plot; and they are shown in FIG. 10A [a diagram showing the catalytic activity (the area ratio activity) of the Pt—Co alloy-supported Ta-doped $SnO_2$ catalyst] and FIG. 10B [a diagram showing the catalytic activity (the mass activity) of the Pt—Co alloy-supported Ta-doped $SnO_2$ catalyst]. Note that in Table 1, x represents the Co content of $Pt_{100-x}Co_x$.

TABLE 1

| x | 0 | 20 | 25 | 33.33 | Pt/CB |
|---|---|---|---|---|---|
| ECSA/ $m_2 \, g_{Pt}^{-1}$ | 66.4 | 71.3 | 70.6 | 56.2 | 68.1 |

These results reveal that the catalytic activity was improved as the content of Co contained in the catalyst was increased and $Pt_{75}Co_{25}$ exhibited the highest activity and that the activity was sharply reduced when the Co content (x) exceeded 25. These results also reveal that $Pt_{75}Co_{25}$ exhibited 2.5 times higher catalytic activity than a commercially available platinum catalyst (a Pt-supported carbon black catalyst).

More specifically, it was found that if a Pt—Co alloy is simply used, catalytic activity that exceeds a commercially available Pt carbon catalyst is not obtained; if the Co content (atomic ratio) is set to 25 or less (if the cobalt content is set to 25 or less with respect to the number of all platinum and cobalt atoms of the Pt—Co metal alloy of 100), excellent effects are produced. Also, if the content (the atomic ratio) of Co in a Pt alloy is less than 33 and 20 or more, excellent catalytic activity can be obtained. More preferably, the Co content of a Pt alloy falls within a range of 20 or more and 25 or less.

Example 2

Fuel cell vehicles, which have received attention in recent years, use PEFC. PEFC uses an electrode material in which particles having diameters of 1 to 20 nm and containing a precious metal are supported on carbon serving as a support. However, PEFC for vehicles often causes a load variation or start/stop corresponding to acceleration or deceleration during traveling, and the then potential of the cathode reaches 0.9 V or more. At this high potential of 0.9 V or more, carbon significantly degrades due to oxidation reaction shown in the above Reaction Formula (1). The electrode catalyst of the present invention uses the support that is free of carbon and stable even at a high potential of 0.9 V or more and therefore can provide a highly durable catalyst. If the electrode catalyst prepared according to Example 1 is used in the fuel cell of a vehicle, particularly, used as the cathode-side electrode of the fuel cell, the required performance of a vehicle-mounted fuel cell can be satisfied. Further, the electrode catalyst of the present invention is able to support the catalyst containing the precious metal exhibiting high catalytic activity and therefore has durability, as well as catalytic activity.

The alloy electrode catalyst of the present invention is expected to be used in electric vehicles and the like having PEFC mounted thereon.

What is claimed is:

1. An electrode catalyst comprising:
   a support particle containing a metal oxide; and
   a precious-metal alloy supported on the support particle, the precious-metal alloy supported on the support particle being prepared in a presence of NaOH, wherein the support particle comprises:
      a plurality of branches;
      a hole between the branches; and
      a pore,
   the pore is surrounded by the branches and the hole,
   the precious-metal alloy is an alloy of platinum (Pt) and cobalt (Co), and
   the metal oxide comprises:
      tin; or
      tin and niobium or tantalum that serves as a dopant.

2. The electrode catalyst of claim 1, wherein the number of cobalt atoms is 20 or more and 33.33 or less with respect to the number of all platinum and cobalt atoms of the precious-metal alloy of 100.

3. The electrode catalyst of claim 1, wherein the number of cobalt atoms is 20 or more and 25 or less with respect to the number of all platinum and cobalt atoms of the precious-metal alloy of 100.

4. The electrode catalyst of claim 1, wherein
   the branches of the support particle serve as an electron conduction path, and
   the pore of the support particle serves as a gas diffusion path.

5. The electrode catalyst of claim 1, wherein the pore comprises a plurality of pores, and
   the pores comprise a pore having a mercury penetration method-based equivalent sphere diameter of 11 nm or less and a pore having a mercury penetration method-based equivalent sphere diameter of more than 11 nm.

6. The electrode catalyst of claim 1, wherein the precious-metal alloy is a particle having a long diameter of 1 to 20 nm.

7. A fuel cell comprising the electrode catalyst of claim 1.

8. An electrode catalyst comprising:
   a support particle; and
   a precious-metal alloy supported on the support particle, the precious-metal alloy supported on the support particle being prepared in a presence of NaOH, wherein
   the support particle comprises a metal oxide,
   the support particle comprises:
      a plurality of branches;
      a plurality of bifurcation points at which the branches are connected together; and
      a pore,
   the pore is surrounded by a plurality of holes surrounded by the bifurcation points,
   the precious-metal alloy comprises at least platinum and cobalt, and
   the metal oxide comprises:
      tin; or
      tin and niobium or tantalum that serves as a dopant.

9. An electrode catalyst comprising:
   a plurality of support particles containing a metal oxide; and
   a precious-metal alloy supported on the support particles, the precious-metal alloy supported on the support particle being prepared in a presence of NaOH, wherein
   the support particles comprise one or more branches,
   the electrode catalyst has a pore among the support particles,
   the precious-metal alloy is an alloy of platinum (Pt) and cobalt (Co), and
   the metal oxide comprises:
      tin; or
      tin and niobium or tantalum that serves as a dopant.

* * * * *